United States Patent [19]
Neef et al.

[11] Patent Number: 5,353,238
[45] Date of Patent: Oct. 4, 1994

[54] WELDING ROBOT DIAGNOSTIC SYSTEM AND METHOD OF USE THEREOF

[75] Inventors: Paul R. Neef, Hoffman Estates; Martin S. Newell, Crystal Lake; David Richards, Barrington; Ashok Singh, Elgin, all of Ill.

[73] Assignee: Cloos International Inc., Elgin, Ill.

[21] Appl. No.: 758,062

[22] Filed: Sep. 12, 1991

[51] Int. Cl.⁵ .............................................. G05B 15/00
[52] U.S. Cl. .................. 364/551.01; 354/552
[58] Field of Search ............. 340/517; 364/551.01, 364/188, 552

[56] References Cited

U.S. PATENT DOCUMENTS

| | | |
|---|---|---|
| 3,988,730 | 10/1976 | Valker . |
| 4,543,567 | 9/1985 | Shirata et al. . |
| 4,749,985 | 6/1988 | Corsberg . |
| 4,812,819 | 3/1989 | Corsberg . |
| 4,815,011 | 3/1989 | Mizuno et al. ........................ 364/188 |
| 4,815,014 | 3/1989 | Lipner et al. ........................ 364/188 |
| 4,816,208 | 3/1989 | Woods et al. ........................ 364/188 |
| 4,816,988 | 3/1989 | Yamanaka ........................... 364/188 |
| 4,914,705 | 4/1990 | Nigawara . |
| 4,951,190 | 8/1990 | Lane et al. ........................... 364/188 |

FOREIGN PATENT DOCUMENTS

0310233A2 12/1988 European Pat. Off. .

OTHER PUBLICATIONS

Supervision and Control System for Power Plants-Carbone et al.-IEEE 1989 (no month)-pp. 1-4.

Primary Examiner—Jack B. Harvey
Assistant Examiner—Thomas Peeso
Attorney, Agent, or Firm—Baker & McKenzie

[57] ABSTRACT

An on-line real time process monitoring system determines not only the existence of a plurality of trouble conditions but also which condition from the plurality should be responded to first. Appropriate display screens are then selected and displayed for the operator to assist in resolution of the problem.

9 Claims, 11 Drawing Sheets

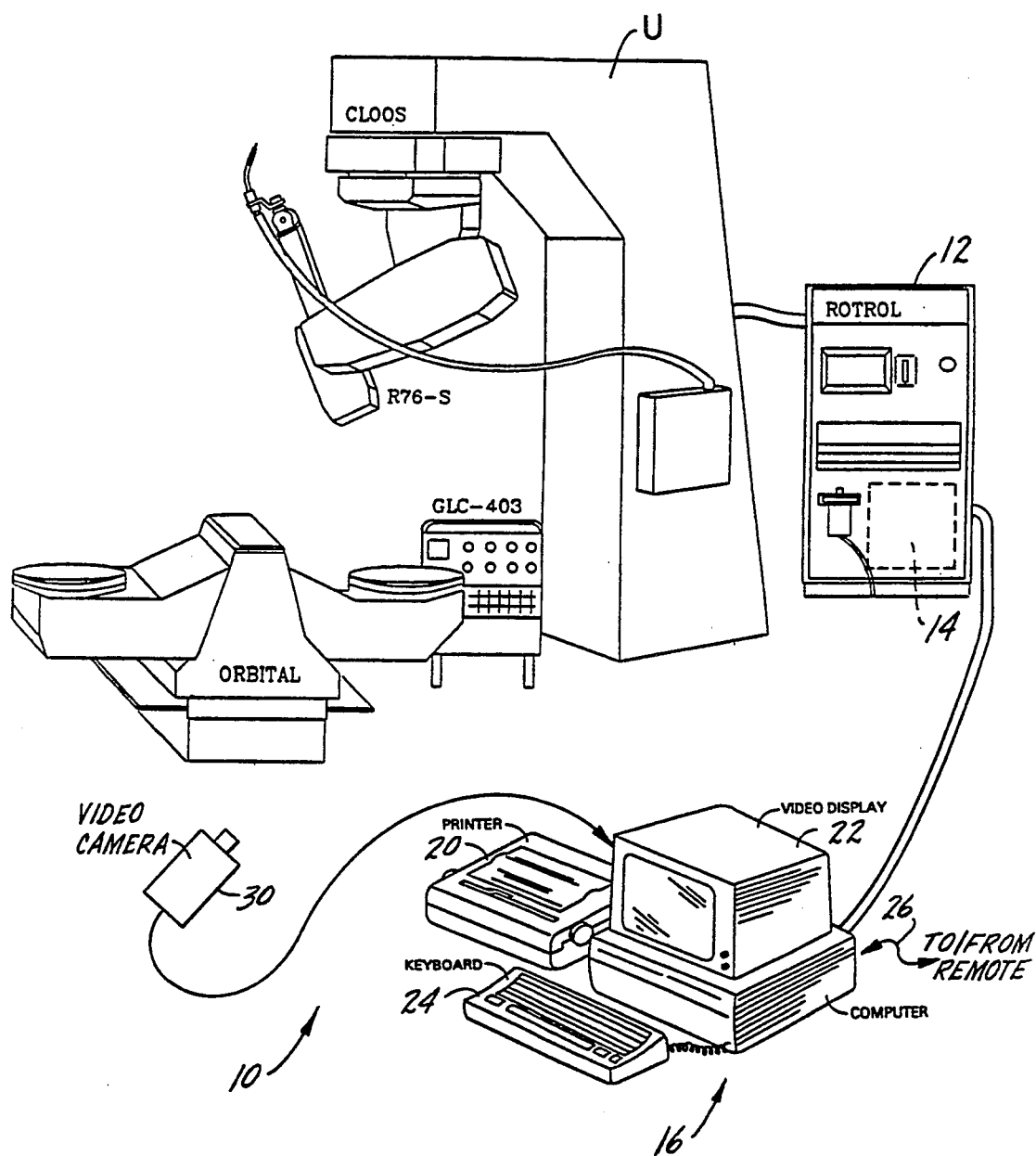

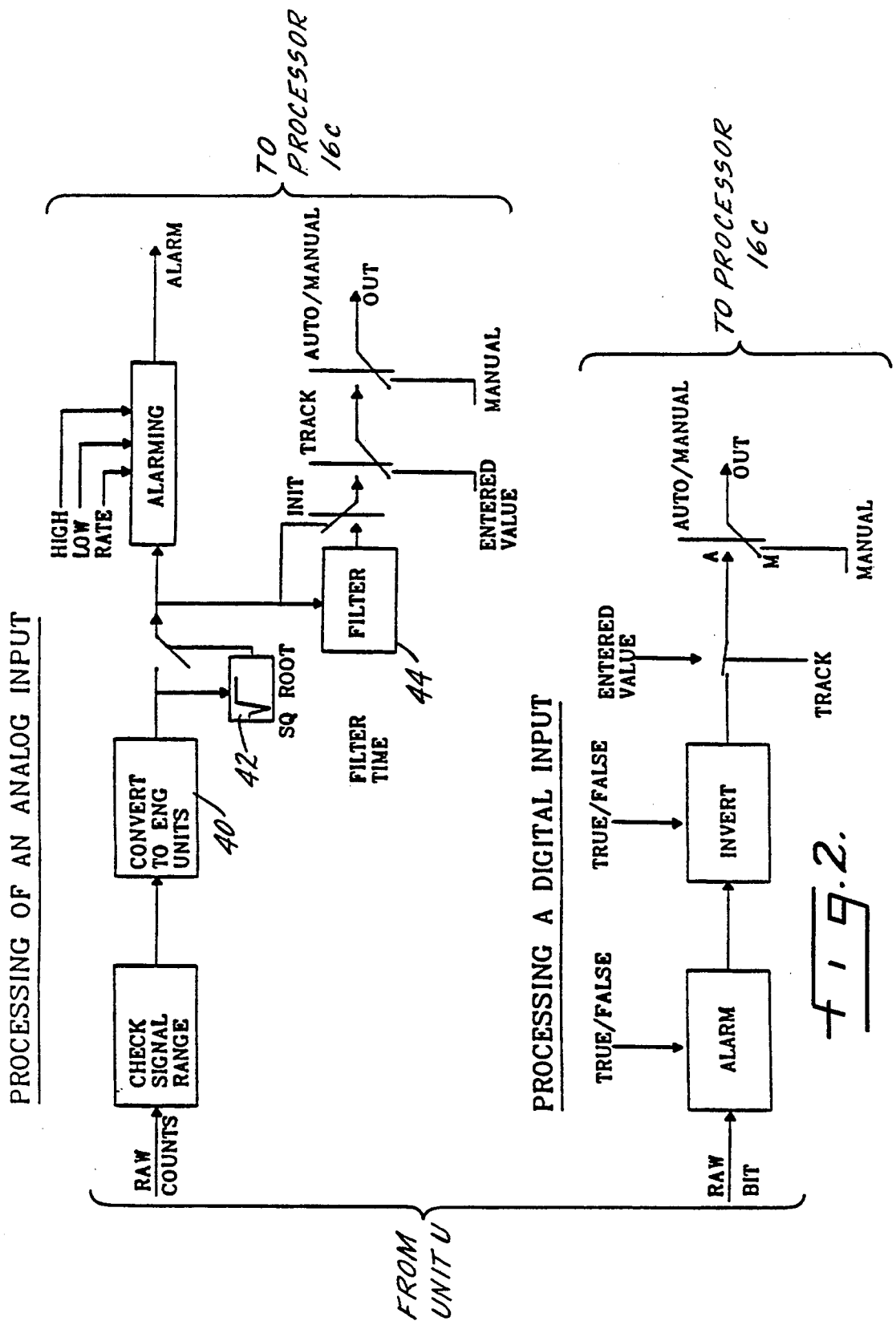

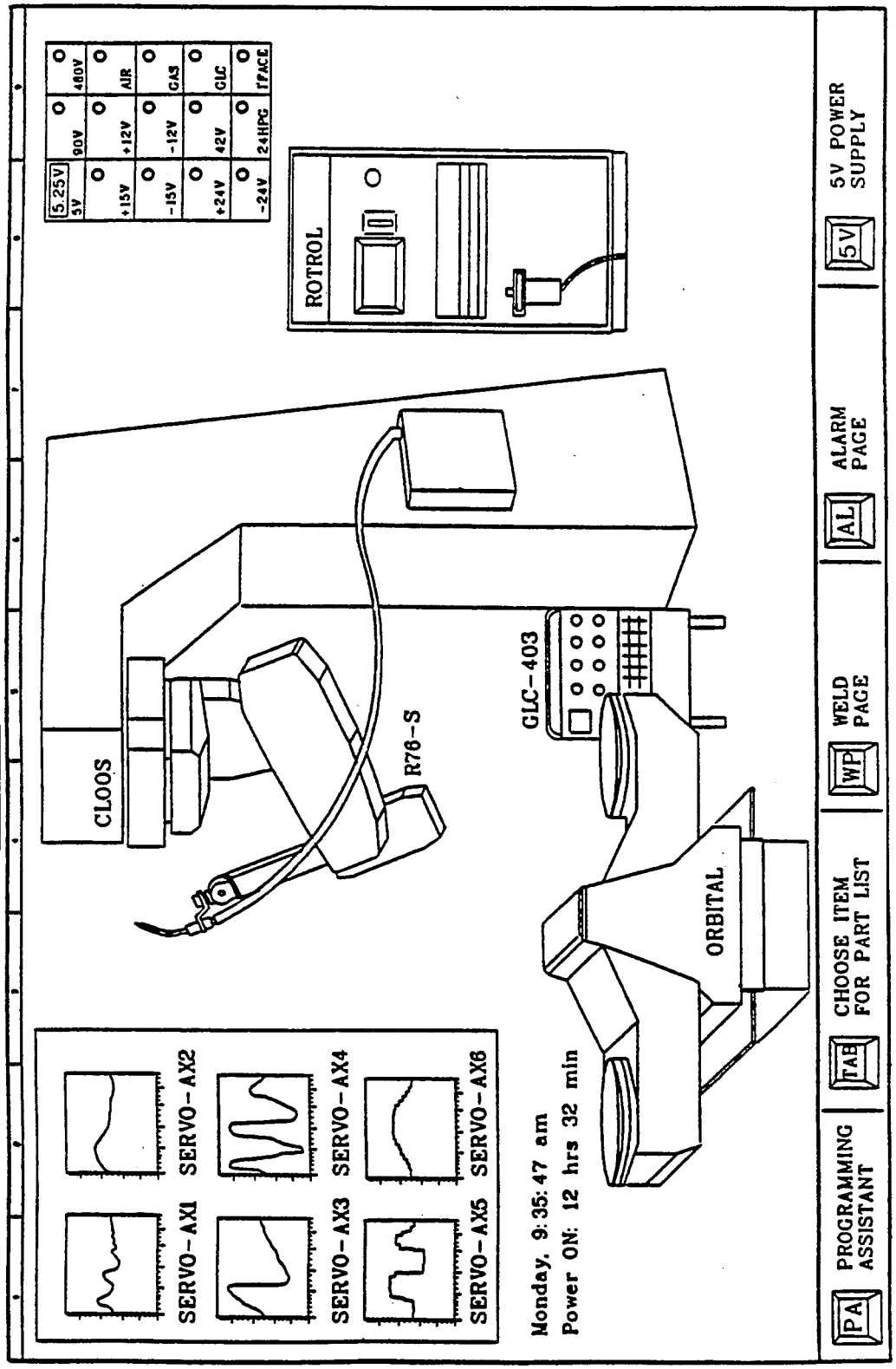

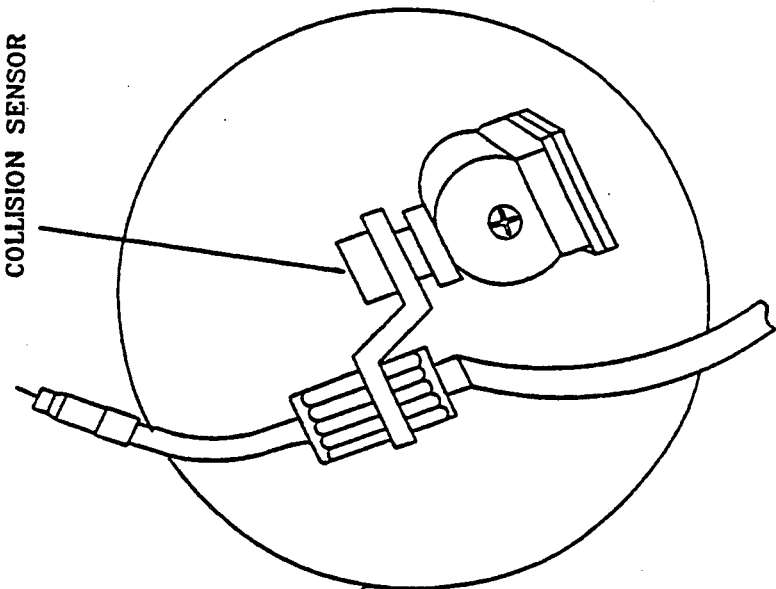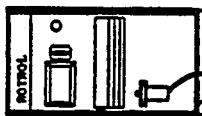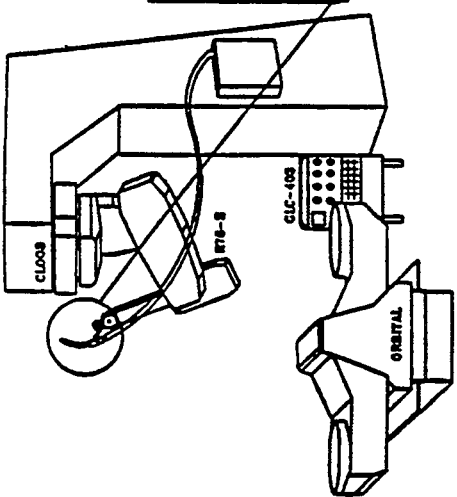

fig. 7.

CLOOS Context Sensitive Help - 1

F6 FOR PREVIOUS SCREEN

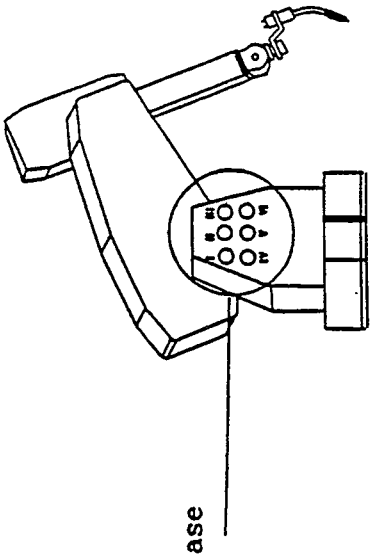

ROMAT 76

Brake Release
Axis 1-6

1. Please check to see if the torch has crashed into the part. If this is the case, relieve the torch by pressing on the brake release buttons on the side of the robot. Subsequently, the "Ready for Operation" light should come ON.

2. It is possible that the switches inside the collision sensor are malfunctioning. This is a rare occurence.

3. Moreover, please check the connection between the cable from collision sensor and the one coming back to the robot controller.

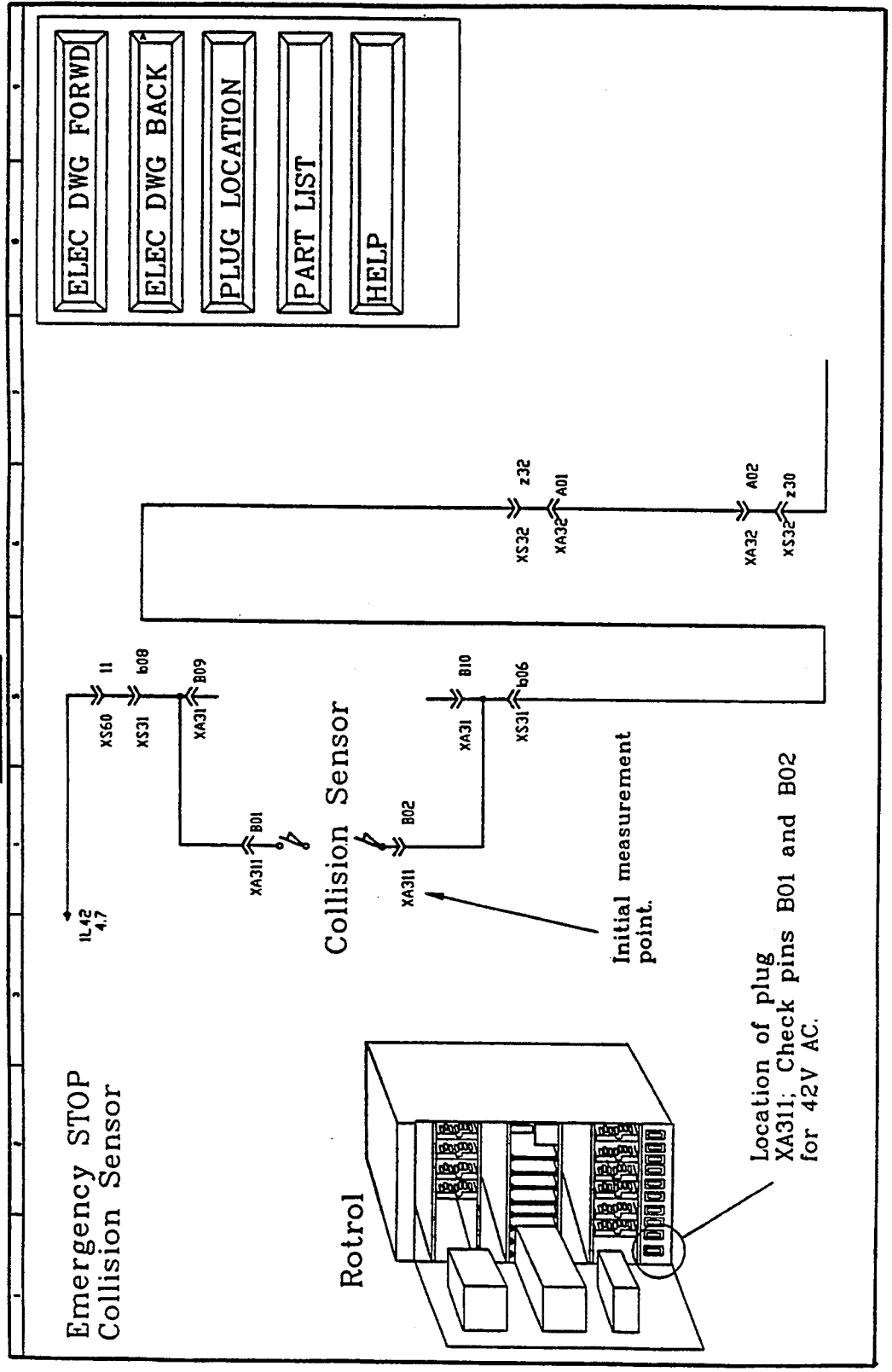

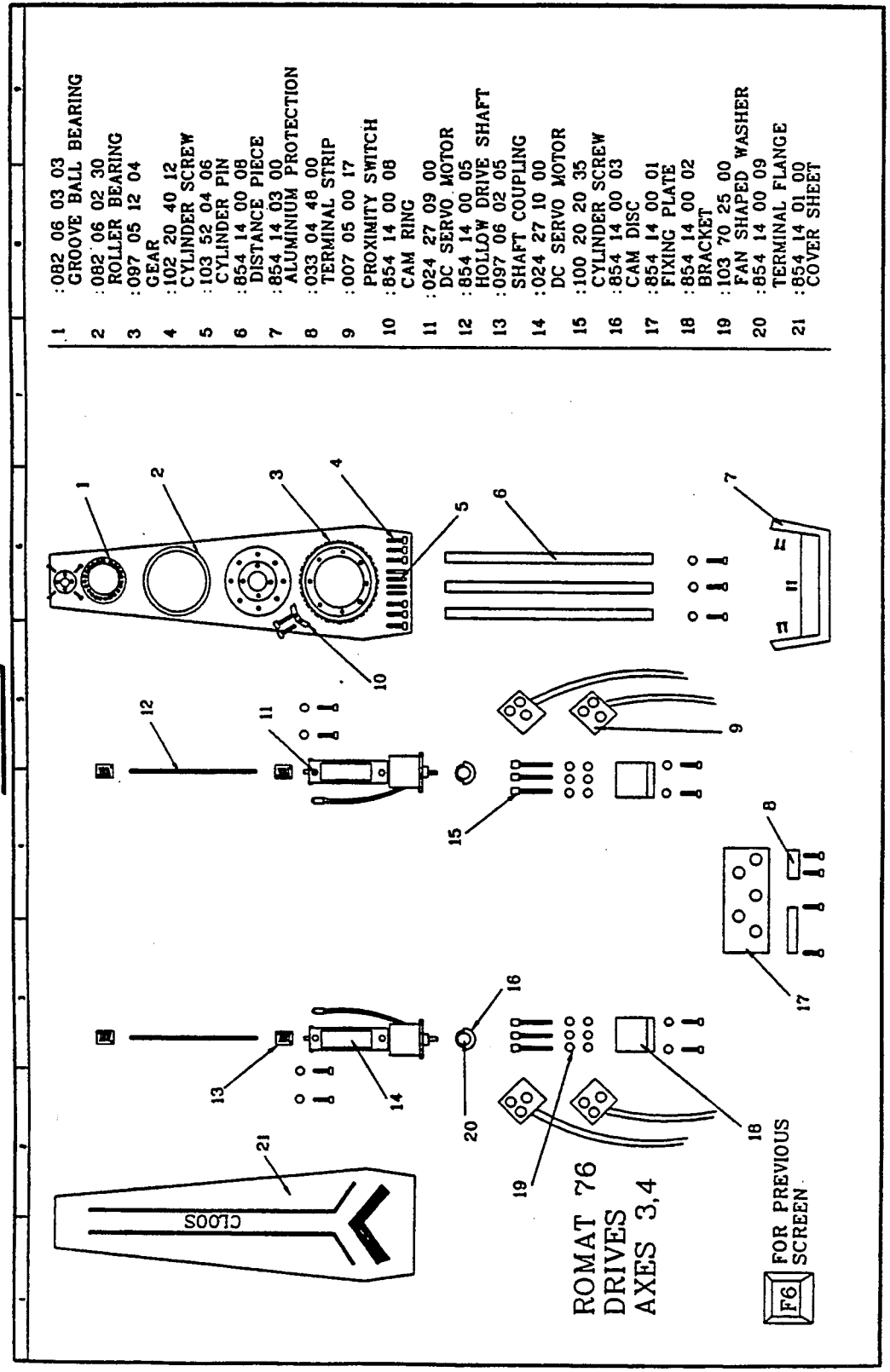

Fig. 10.

SENSOR COMMANDS

The sensor commands are used when using any form of touch (wire,nozzle) or proximity sensing.

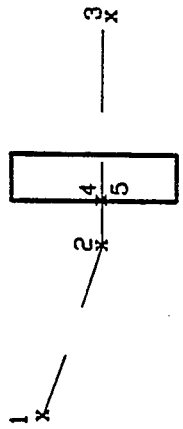

Basically, when using the sensor commands, a voltage is supplied to the wire, and when contact is made with the part, an input is received. The distance the robot moved before it found the part. Now the same logic could be used to find any new part to be welded. For a new part, a similar relationship from points 2 --> 4 is established and the difference between these two readings indicates the shift in the part.

```
LIST 1=(20,0,0,0,0,0,0,0,0)  ! Welding list
MAIN
GP (1,2)
SET (2)         ! Set 24V DC output
STORPOSR (3,100,0,0;1:1000)
$ (1)           ! Activate a welding list
WHEN IN(2) DURING GC(3) THEN JUMP FOUND
WRITE (' ERROR - PART NOT FOUND ')
PAUSE
FOUND:
$ (0)           ! Turn Off welding list
RESET (2)
STORPOS (4,50,0,0) ! Store present position
STORPOS (5,50,0,0) ! Store present position
CHANGE (4,5)
WRITE (' SENSING OVER ')
END
```

[F6] FOR PREVIOUS SCREEN

WELDING ROBOT DIAGNOSTIC SYSTEM AND METHOD OF USE THEREOF

FIELD OF THE INVENTION

The invention pertains to on-line real time process monitoring and control equipment and methods. More particularly, the invention pertains to a computer based monitoring system which can determine which of a plurality of problems has the highest priority such that the operator can deal with the highest priority problem first.

BACKGROUND OF THE INVENTION

Present day robot systems are required to meet stringent production schedules and targets. A malfunctioning of any critical component of the unit often makes this task not only difficult, but sometimes impossible. A prolonged equipment breakdown adversely affects the production output of that unit and sometimes, depending upon the flow of parts in the assembly line, adversely affects the performance of the manufacturing cells preceding and succeeding it.

Reasons for extended down-time intervals range from a lack of necessary training for the operator, tremendous variety and nature of problems that can arise, physical distance of the equipment from available help, to time lapses between occurrence and realization of the existence of a problem. To be able to address the above issues, it would be desirable to continuously and automatically monitor and diagnose problems, as they occur.

Meaningful conclusions can only be drawn from good data. As a result, it will be necessary to identify signals which will provide clues to sources of problems. Since the ongoing manufacturing process cannot be disrupted, it is important that any monitoring system not only track process conditions in real time, but that the tracking itself be non-disruptive.

Thus there is a need for a non-disruptive monitoring system which can assist an operator in analyzing and diagnosing problems.

SUMMARY OF THE INVENTION

A monitoring apparatus and a method are provided for carrying out real time monitoring of an ongoing industrial process being executed by an industrial tool. In a disclosed embodiment the process is a complex welding activity wherein multiple welds are made in a work piece.

The apparatus includes circuitry for sensing a plurality of analog and digital inputs from the tool. Interface circuitry conditions the signals received form the sensors and generates electrical representations thereof. These representations are compatible with other circuitry.

The apparatus also includes circuitry for analyzing the conditioned electrical representations and for prioritizing any trouble conditions indicated by the sensed signals. The highest priority trouble condition can be determined by stepping through a prestored decision tree. The decision tree can be implemented in a variety of different ways.

The highest priority trouble condition is then used to retrieve a prestored visual screen (or screens) that is (are) indicative of the trouble condition. The prestored screen (or screens) can then be displayed for review by an operator. Operator assisting text and graphical information associated with that condition is displayed.

The operator can enter requests for additional information pertaining to the detected trouble condition and can also interrupt the presence or absence of some graphs from the computer console. Additional screens can be retrieved and displayed in response to operator input. Depending on the operator input, the subsequent screens focus on one aspect or another of the trouble condition to be remedied.

Incoming signals from the tool are scanned on a variable repetitive basis. When a current trouble condition has been resolved, the then current highest priority trouble condition is determined. If a higher priority condition has appeared in the latest scan than had previously been detected, that higher priority condition initiates the next operator assisting display. Although trouble conditions may exist, the scanning of inputs continues in the background, albeit at a different rate if necessary.

A particularly advantageous feature of the present invention is an ability to sample inputs at different rates in response to the state of the tool. Thus, where a signal value from time to time becomes especially important, or the signal may be changing state at an unusually high rate, the sample rate can be increased accordingly. Similarly, where the monitoring system is responding to a trouble condition, the rate of sampling of unrelated signals can temporarily be decreased. Where a trouble condition has been identified, signal sampling will continue on a background basis.

In one aspect of the invention, the displayed screen graphically indicates the nature of the problem. A simple menu is provided for requesting additional help. This help is provided in the form of simple remedial steps and measures, relevant electrical diagrams, locations of key signal measurement points if necessary, part numbers for reordering, and setup guidelines if new parts are installed.

Moreover, the time the problem occurred along with a brief description are recorded and printed. Subsequently, the time the problem was resolved is also printed.

Depending upon the type of problem, the apparatus will automatically notify a supervisor. The apparatus can also be manually interrogated to provide information about the relevant signals, both locally and from a remote site.

For interrogation from a remote site, a telephone connection is first established and subsequently the desired data is transferred. Although in its disclosed implementation, the apparatus monitors a robot welding unit, it is not so limited. The apparatus can be read to monitor any electro-mechanical device, capable of generating electrical signals.

In another aspect, the apparatus monitors the manufacturing task the robot is performing. In the disclosed implementation a welding process is monitored. This is accomplished by monitoring relevant welding related parameters, such as wire feed speed, welding voltage, gas flow rate and any other critical welding parameters.

This welding process information is then compared to programmed parameters, and also to a historical database of the process. Any deviations exceeding a tolerance level result in an alarm.

Often this alarm is a mere warning. In critical applications however, the process can be halted to make necessary corrections before continuing.

In another aspect of the invention, the apparatus provides a comprehensive programming assistant which can be used to provide help in programming the robot. This option is invoked from a displayed screen.

Simple menu guided screens provide programming help such as robot software command explanations and usage, along with example programs. Information is also provided about part numbers of different components and sub-components for the complete welding unit.

In yet another aspect of the invention, the apparatus provides historical information about the tool and the process. Since the apparatus continuously monitors the signals, a gradual deterioration of the strength of any signal can forewarn about an impending breakdown.

Thus, certain problems can be anticipated and preemptive measures taken to avoid a breakdown. Moreover, relevant statistical information can also be gathered over a period of time, to provide information on issues such as production efficiency, cycle times, idle times, and frequency and nature of breakdowns.

The apparatus can additionally include an operator focused video camera. This camera can be directed toward the relevant problem area, if necessary, and a live video signal can be transmitted to a remote service department.

This video signal can either represent a series of snapshots of the system, processed by a dedicated microcomputer, and transmitted using the telephone lines, or live image transmission, very similar to that occurring in a television transmission. This offers the added benefit that remote service personnel can actually watch and assist the operator or maintenance electrician onsite.

The apparatus can be implemented with a programmed microcomputer. A video monitor coupled to the microcomputer, can be used to display various screens for the operator.

A control program executed by the microcomputer can, in conjunction with interface hardware, carry out the signal sampling operation at a predetermined rate. The control program can also execute a predetermined decision tree.

Numerous other advantages and features of the present invention will become readily apparent from the following detailed description of the invention and the embodiments thereof, from the claims and from the accompanying drawings in which the details of the invention are fully and completely disclosed as a part of this specification.

BRIEF DESCRIPTION OF THE DRAWING

FIG. 1A is an overall, pictorial diagram of an industrial tool and an apparatus in accordance with the present invention coupled thereto;

FIG. 2 is a schematic diagram of analog and digital input processing circuitry usable with the apparatus of FIG. 1;

FIG. 5 is an exemplary display screen indicating a normal ongoing welding process;

FIG. 6 is a display screen indicating an emergency stop condition;

FIG. 7 is an exemplary context sensitive help screen associated with the emergency stop display screen of FIG. 6;

FIG. 8 is a display screen of an exemplary circuit diagram associated with the emergency stop display screen of FIG. 6;

FIG. 9 is an exemplary display screen illustrating various parts that might have to be replaced to deal with the stop condition of the screen of FIG. 6;

FIG. 10 is an exemplary display screen illustrating program assistance information.

DETAILED DESCRIPTION OF THE PREFERRED EMBODIMENTS

Figure 1B:
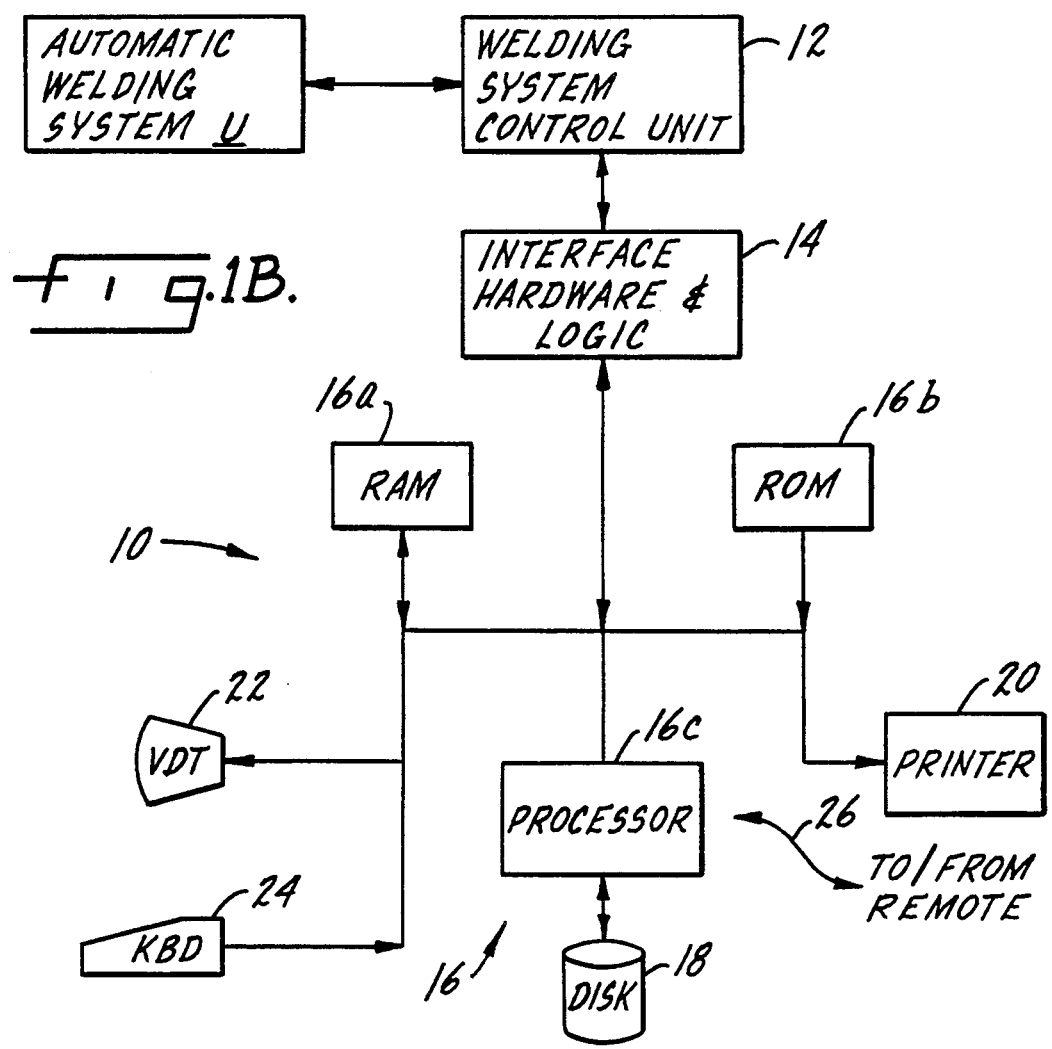
FIG. 1B is a block diagram representation of the apparatus of FIG. 1A.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1A is an overall diagram of a monitoring apparatus 10 in accordance with the present invention. FIG. 1B is a block diagram representation of the apparatus 10 illustrating various details thereof.

The apparatus 10 is coupled to a control unit 12 which directly controls the operation of an exemplary automatic welding unit U. The unit U is a production line tool that might be used for production of parts requiring numerous welds. Other types of industrial tools can be monitored by the apparatus 10.

The apparatus 10 includes interface hardware and related logic 14 which enable a monitoring computer 16 to interface to and communicate with the welding system control unit 12 and the automatic welding unit U. The monitoring computer 16 includes a control program stored in part in random access memory 16a. The control program carries out the monitoring sequence. Read only memory 16b and a processor 16c also form part of the computer 16.

A disk drive 18 is coupled to the computer 16 along with a printer 20 for hard copy output. A visual display 22 and a keyboard 24 are also coupled to the computer 16 for visual output and manual input respectively.

A data link 26 can be provided such that information can be transmitted to or received from a remote computer or terminal corresponding to the monitoring computer 16. In this way, the operation and performance of the welding system U can be monitored from a distant location. The monitoring individual at the distant location is able to see exactly the same set of screens and obtain the same information that the operator has available at the local display 22.

A video camera 30 can be used for real-time image generation. Signals from the camera 30 can be viewed locally or via communications link 26 can be transmitted to a remote installation.

The apparatus 10 monitors those signals which must be present in the control unit 12 and welding system U to insure satisfactory performance. For example, electrical signals such as voltages or currents associated with various electronic hardware, motors, brakes encoders, tachometers, servo amplifiers, various different electrical relays, switches, safety circuits and stop/start circuits must be present and have the appropriate values. Usually, when a machine malfunctions, one or more of these signals is absent.

The signals are detected in the interface hardware and related logic unit 14. The signals are of two types, either analog or digital.

FIG. 2 illustrates exemplary processing interface circuitry for an analog input as well as for a digital input.

Digital signals are represented as either ON or OFF or 0 or 1, and indicate presence or absence of a certain voltage. Analog signals indicate quantitative strength of the signal, as opposed to presence or absence of one. Before any signal can be monitored, it must be rendered measurable for the data acquisition hardware.

Since some analog signals are not in the range the data acquisition hardware can accept, these signals are conditioned; often simply to adjust the amplitude. The amplitude is adjusted in circuitry 40 to get the highest possible resolution i.e., the maximum voltage swing of the signal should equal the maximum input range of the A/D (Analog to Digital) convertor.

Additional mathematical processing can be carried out by circuitry 42 if necessary. If the signal is not conditioned before it is relayed to the computer 16, electrical noise between signal source and computer may be detrimental to performance. Filter circuitry 44 can be used to improve signal characteristics.

Digital signal conditioning is also used to monitor low current TTL signals, and to isolate the computer and data acquisition hardware from incoming signals, for protection from high voltage spikes.

In cases where sensors are used to monitor physical phenomena, such as gas flow rates, temperature, displacement, or actual speed in welding wire, the sensor converts this physical effect into an analog signal which is then measured by an A/D convertor. The wide variety of signals to be monitored is accomplished by using standard remote Input/Output devices. The type of signals include 500 mV through 3, 12, 15, 24 Volts DC, different AC voltages, and physical phenomenon such as temperature, flow rate, speed of revolution, and pressure.

Once the relevant signals have been conditioned and sampled at a desired frequency, they are combined and brought into the computer 16. Since incoming signals represent a snapshot of the state of the welding unit U at a point in time, the closer these snapshots are taken in time, the better is the reconstruction of the state of the unit U in the computer 16.

The Sampling Theorem requires that signals be sampled at twice the rate of the highest signal frequency that needs to be monitored. The apparatus 10 samples signals at a minimum rate of once every 2 milliseconds. However, not all signals need to be sampled at this rate. Usually the state of the machine determines which signals are sampled at what frequency.

For example, if the sensing circuitry detects the robot "arm" power (a separate input) as ON, it ignores inputs such as end limit switches and reference switches, for their presence is essential to the presence of "arm" power. Similarly, if the signal representing the presence of an ignited a welding arc is detected, welding process related signals are examined and simultaneously, other robot hardware signals can be ignored, for they must be present for the above condition to exist. This is adequate, for example, for monitoring signals from the welding unit U.

For flexibility, the sampling frequency of the apparatus 10 can be altered. Certain signals, depending on their characteristics, are sampled faster than others. The scanning rate can thus be adjusted in real time depending on the signal being sampled.

Once the signals have been sampled at the desired frequency, they are analyzed either in the interface hardware 14 or in the computer 16. Sometimes the hardware 14 provides a part of the analysis function and the computer 16 completes it.

To provide real time processing, a fast 80386-type microcomputer (with a math co-processor) is used. In relatively low speed applications involving sampling and updating once or twice a second, a low end PC of the XT-type would suffice.

The sampled signals are then manipulated and analyzed to evaluate and predict the operation of the robot unit U. The present method treats the incoming digital signals as either ON or OFF, or 1 and 0. Analog signals are treated based on their quantitative strength or value.

Figure 3:
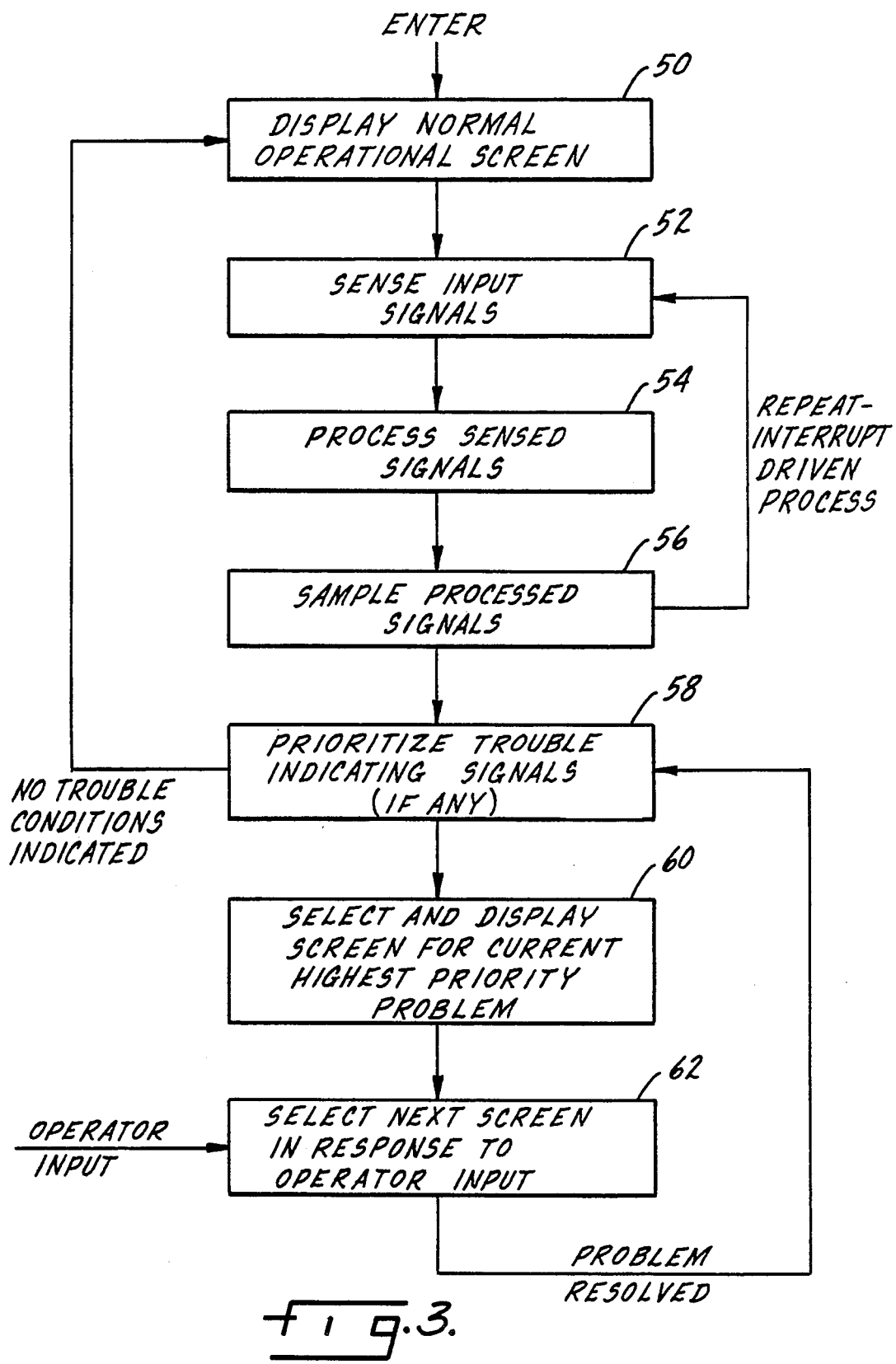
FIG. 3 is an overall flow diagram of a monitoring method in accordance with the present invention.

FIG. 3 illustrates a flow diagram of a monitoring process in accordance with the present invention. In an initial step 50, a normal operating screen is displayed on the display unit 22. This provides information to the operator as to the ongoing processing and values associated with various parameters of the process.

In a step 52, both analog and digital input signals are sensed. They are processed in circuitry of the type illustrated in FIG. 2 in a step 54.

In step 56 the processed signals are sampled at an appropriate rate where necessary. The steps of sensing, processing and sampling are continuously taking place.

The sampled signals along with sensed and processed digital signals are then combined and prioritized in a step 58 to determine the highest priority problem if there is one. In a step 60 a display screen associated with the current highest priority problem is then selected and displayed. At that time, the operator can provide inputs specifying other screens that are required to deal with the problem. Choices include screens with explanatory text or circuit diagrams.

In a step 62, the next screen is displayed in response to operator input. In the step 62, the operator can sequence through a plurality of different screens which can be helpful for purposes of determining what the current problem is and how it should be solved.

Once the problem has been resolved, the system returns to the step 58 and displays the screen associated with the then highest priority problem and the process is repeated. Once all of the problems have been resolved and the unit is operational, the system returns to the step 50 and displays the normal operating screen.

Figure 4:
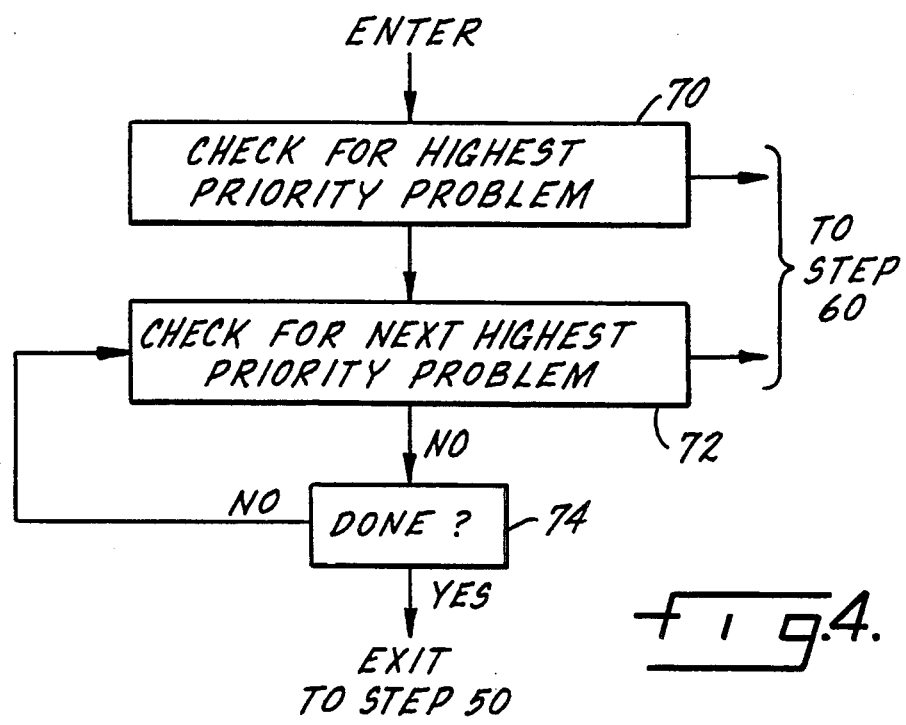
FIG. 4 is a flow diagram of a particular prioritizing technique usable with the method of FIG. 3.

FIG. 4 illustrates a flow diagram of a method of prioritizing input signals. In a step 70, upon entry into the prioritizing process, the system checks for whether or not, based on the current set of sampled analog and digital inputs the highest priority problem is present. If so, the system returns to step 60 and displays a screen associated with that particular problem.

If the highest priority problem is not present, the apparatus 10 in a step 72 checks for the next highest priority problem. If that problem is present, the apparatus returns to the step 60 and displays screens associated with solving that problem.

In the absence of that problem, in a step 74, the apparatus 10 determines whether or not it has completely stepped through the problem decision tree. If not, it returns to the step 72 and determines whether the next highest priority problem is present. If it has completed the decision tree, the apparatus then exits and returns to the step 50.

FIG. 5 illustrates a typical or representative normal operating screen that is displayed in the step 50. As illustrated in FIG. 5, an image is displayed of the welding unit U as well as auxiliary equipment. On the left side of the screen of FIG. 5 current and recent values of various parameters of interest about the servo drives for the welding unit U are displayed.

FIG. 6 illustrates a screen displayed in step 60 in response to a detected emergency stop that has taken place. The detected emergency stop was due to the welding torch having collided with a portion of the part being welded or related equipment.

In the lower left corner of FIG. 6 a plurality of keys is displayed. Each of these keys in turn indicates various additional screens available to the operator depending on which key is selected.

Depending on the key depressed on the keyboard 24 by the operator, a context sensitive help screen, such as illustrated in FIG. 7 can be displayed in the step 62. Alternately, a diagnostic electrical diagram, such as illustrated in FIG. 8 can be displayed. Other types of abnormal conditions will provide to the operator different combinations of additional screens to select.

FIG. 9 illustrates a parts list screen that can be displayed for purposes of repairing a damaged or defective part. FIG. 10 illustrates a programming aid screen usable in the event that the repair process requires that programming changes be made to the control unit 12.

Once the reason for the emergency stop has been determined and the problem resolved, the apparatus 10 will return either to the step 50 to display a normal operating screen or the step 48 to display a screen associated with the next highest priority problem which must be solved.

Figure 11:
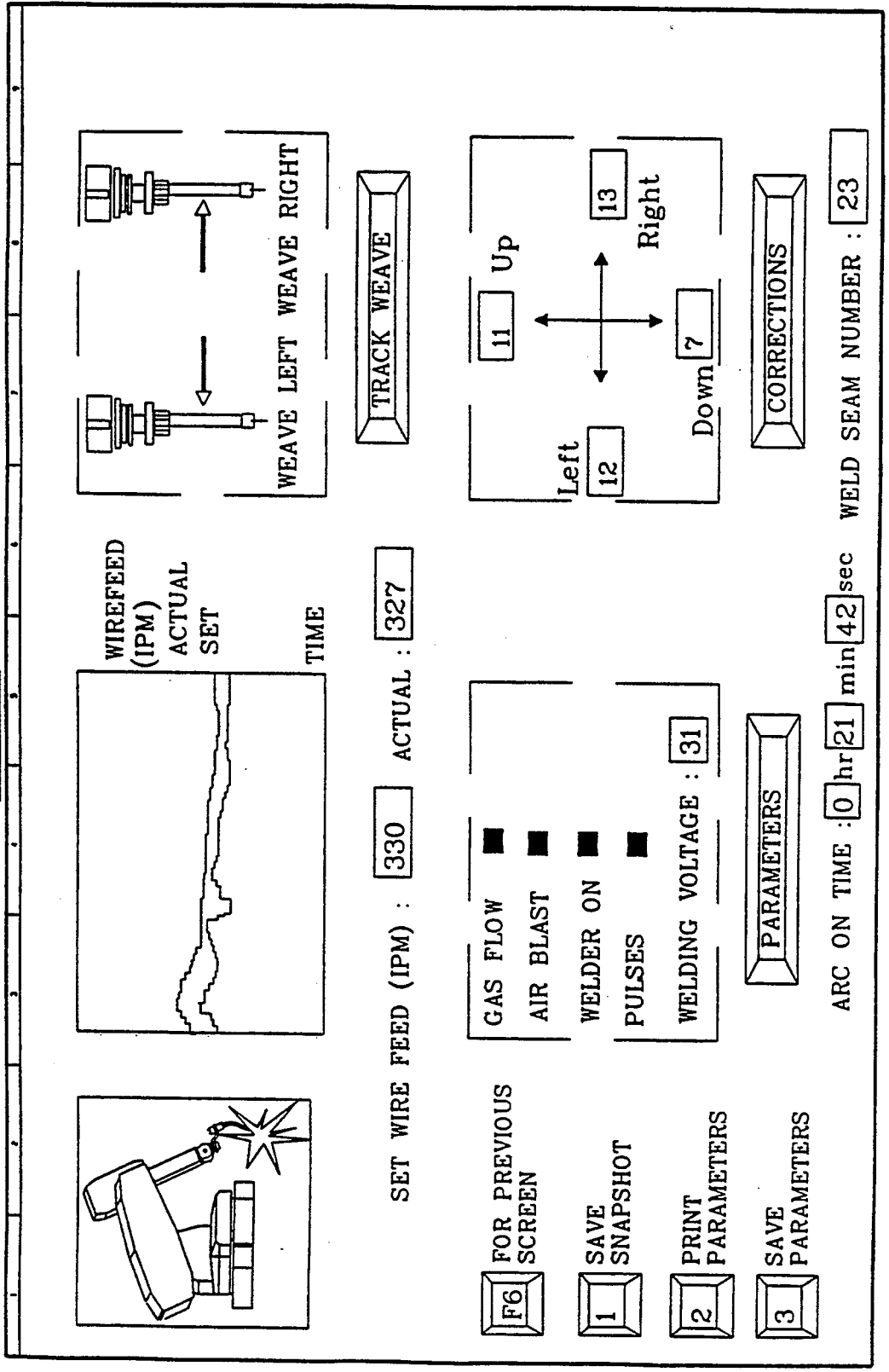
FIG. 11 is an exemplary display illustrating parameters of an ongoing properly functioning industrial process.

In addition to monitoring trouble conditions, the apparatus 10 can monitor the ongoing welding process and provide continuous real time information to the operator concerning parameters of that process. FIG. 11 illustrates a typical screen displayed for the operator while the welding process is ongoing.

Critical parameters and monitored in real time and any deviations from preset values, beyond a tolerance range, result in an alarm being generated. Thus close control of ongoing process parameters can be maintained.

It will be understood that the apparatus 10 is not limited to monitoring a welding process. It can be used with any type of industrial process which generates a plurality of signals and which can have one or more problems that arise which can result in an interruption of the process.

An alternate exemplary process to analyze signals from an Emergency Stop circuit in the unit U would monitor a certain number signals to determine the source of the problem. As indicated in Table 1, eight series coupled digital signals, numbered 0 through 7, are monitored for a typical Emergency Stop circuit.

TABLE 1

| INPUT 0 | Collision Sensor |
| INPUT 1 | Emergency Stop - External 1 |
| INPUT 2 | Emergency Stop - Door |
| INPUT 3 | Emergency Stop - External 2 |
| INPUT 4 | Emergency Stop - PHG |
| INPUT 5 | Emergency Stop - External 3 |
| INPUT 6 | Emergency Stop - Pressure Switch |

TABLE 1-continued

| INPUT 7 | Ready for operation |

Since each signal is digital, it is represented as either a 0 or 1. The analysis method then evaluates these signals in the following manner. For the above analysis, an ON condition is inverted and treated as $\phi$ and an OFF condition is similarly treated as 1.

A typical algorithm to implement the above boolean algebraic logic and the particular software form it takes is described below. The following program explains the analysis carried out to determine which of the 8 inputs is the source of the malfunction.

```
IF ((input0 or input1) XOR (input2 AND input3
AND input4 AND
       input5 AND input6 AND input7)) THEN
       { Display the required screens and
       activate operator input}
       SHOW FIGURE-EXTERNALLY;
   ELSE
   IF ((input0 or input1 or input2) XOR (input3 and
input4 AND
       input5 AND input6 AND input7)) THEN
       SHOW FIGURE-DOOR;
   ELSE
   IF ((input0 OR input1 OR input2 OR input3) XOR
(input4 AND
       input5 AND input6 AND input7)) THEN
       SHOW FIGURE-EXTERNAL2;
   ELSE
   IF ((input0 OR input1 OR input2 OR input3 OR
input4) XOR (input5 AND input6 AND input7)) THEN
       SHOW FIGURE-PHG;
   ELSE
   IF ((input0 OR input1 OR input2 OR input3 OR
input4 OR INPUT5) XOR (input6 AND input7)) THEN
       SHOW FIGURE-EXTERNAL3;
   ELSE
       o
       o
       o
       o
   ENDIF
   ENDIF;
   ENDIF;
   ENDIF;
ENDIF;
```

Assume that the signal INPUT 2, Emergency Stop, Door, is lost. The loss of signal 2 would cause the loss of all signals thereafter, thus probably indicating multiple emergency stops. To identify that signal number 2 is lost or $\phi$, a three step boolean algebraic analysis could be used.

In Step 1, inputs through 2 are logically "ored" together:

Step 1—(input0 OR input1 OR input2)

In Step 2, inputs 3–7 are "anded" together:

Step 2—(input3 AND input4 AND input5 AND input6 AND input7)

In step 3, the boolean results of Step 1 and Step 2 are "exclusive-ored" together. The output will be a binary signal indicating the presence of the subject imaginary condition.

If signal 2 is lost, the output of the first step would be 1 or TRUE, and that of the second step would be 0 or false. Therefore, the output of Step 3 would be 1 or TRUE thereby indicating the loss of signal number 2.

Similarly to examine the loss of signal number 5, the three step process would be:

In Step 1 inputs 0–4 are logically "ored" together:

Step 1—(input0 OR input 1 OR input2 OR input3 OR input4)

In Step 2, inputs 5-7 are "anded" together:

Step 2—(input5 AND input6 AND input7)

In Step 3, the boolean results of Step 1 and 2 are "exclusive-ored" together. The output will be a binary signal indicating the presence of the subject emergency condition.

This analysis process can be implemented in part in interface circuitry 14 and in part in processor 16c. Alternately it could be implemented fully in processor 16c.

Once it has been determined that a signal has been lost, a new screen indicating the problem area is automatically displayed in the step 60. For example, if the collision sensor reports an occurrence of a crash, the relevant screen, for example FIG. 6, indicating the problem is displayed. Then, as described above, the user could then use the accompanying menu to interrogate the apparatus to receive assistance on steps to resolve the problem (FIG. 7), view pertinent electrical diagrams and measurement points (FIG. 8), or related parts lists (FIG. 9).

The screen indicating the problem stays on till the problem is resolved. The apparatus 10 can also issue an alarm to indicate the event.

An exemplary alarm screen is illustrated in Table 2. This alarm screen can be printed and retained in the computer's memory. Since all this information can also be obtained at a remote site, a remote service department can easily view and monitor the status of robot systems in different geographical locations.

means for storing a plurality of predetermined screens associated with various potential trouble conditions;

means for selecting a prestored screen associated with the highest priority trouble condition and for displaying the selected screen;

means, responsive to operator input, for selecting a different screen;

means, for monitoring amounts of supplies consumed during the process; and means for automatically displaying a representation of at least some of said supplies consumed.

2. A system for monitoring a plurality of inputs indicative of an ongoing industrial process comprising:

means for sensing a plurality of inputs identifying various process conditions;

means, coupled to said sensing means, for processing said inputs;

means, coupled to said sensing means, for analyzing and prioritizing said inputs including means for identifying a highest priority condition;

said means for analyzing and prioritizing includes a decision tree means for identifying said highest priority condition;

means, coupled to said means for analyzing and prioritizing and responsive thereto, for generating an indicium identifying said highest priority condition;

means for automatically linking a condition identifying prestored text message to said indicium;

means for visually displaying a representation of said

| | | CLOOS INTERNATIONAL ALARM/EVENT SUMMARY | |
|---|---|---|---|
| TIME | VARIABLE | DESCRIPTION | NOTES |
| 9:37:47 AM | ESTOP-1 | EMERGENCY STOP 1; POSSIBLY COLLISION SENSOR | COLLISION SENSOR FAILED |
| 9:45:12 AM | ESTOP-1 | EMERGENCY STOP 1; POSSIBLY COLLISION SENSOR | COLLISION SENSOR OK! |
| 9:50:15 AM | ARCIGN1 | WELDING ARC IGNITED | ARC ON |
| 9:52;10 AM | ARCNIGN1 | WELDING ARC OFF WIREFEED: 330 IPM: VOLTAGE: 31 v: SEAMTRK ON SEAMTRK (3,4,12,17); ARC ON TIME: 1M 55S | ARC OFF |
| 12:42:23 PM | 5VPSUL | 5 V POWER SUPPLY UNIT; POSSIBLY LOW | 5 V SUPPLY LOW; 5.1 V |
| 12:50:54 PM | 5VPSUNL | 5 V POWER SUPPLY UNIT: AS SET | 5 V SUPPLY OK: 5.31 V |

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

We claim:

1. An operator assisting apparatus for monitoring an ongoing industrial process which generates a plurality of output electrical signals comprising:

means for sensing the plurality of output electrical signals;

means, coupled to said means for sensing the electrical signals, for processing the sensed electrical signals;

means for establishing a priority of trouble conditions from among the processed signals;

said means for establishing a priority of troubled conditions includes means for executing a decision tree so as to determine which of a plurality of trouble conditions has the highest priority;

indicium;

means for periodically initiating said analyzing and prioritizing;

means for recording indicia reflecting supplies consumed during the process;

means for automatically displaying a representation of at least some of said supplies consumed; and communications means for transmitting selected information to remote locations.

3. A system as in claim 2 including a video camera coupled to said means for transmitting selected information.

4. An apparatus usable to provide operator assisting alarm related information for an industrial tool that is operable in an essentially automatic mode, the apparatus comprising:

circuitry for sensing a plurality of inputs from the tool;

said circuitry for sensing a plurality of inputs includes means for altering a rate of sensing one or more of the inputs;

circuitry for processing at least some of the inputs and for generating electrical representations thereof;

means, coupled to said circuitry for generating electrical representations, for storing sequences of screen images associated with various alarm conditions;

manually operable means for operator input, coupled to said circuitry for generating electrical representations for selecting among screen images associated with an identified alarm condition;

circuitry, coupled to said circuitry for processing at least some of the inputs and for generating electrical representations thereof, for executing a prestored decision tree and for identifying a highest priority alarm condition for the tool;

circuitry, responsive to said circuitry for executing said prestored decision tree and for identifying a highest priority alarm condition for the tool, for providing a representation of said alarm condition.

5. A system for monitoring a plurality of inputs indicative of an on-going industrial process comprising:

means for sensing a plurality of inputs identifying various process conditions;

said means for sensing a plurality of inputs includes means for altering a rate of sensing one or more of the inputs;

means coupled to said sensing means for processing said inputs;

means, coupled to said processing means, for analyzing and prioritizing said inputs including means for identifying a highest priority condition;

means, coupled to said means for analyzing and prioritizing said inputs and responsive thereto for generating an indicium identifying said highest priority condition;

said means for analyzing and prioritizing said inputs includes decision tree means for identifying said highest priority condition;

means for automatically linking a condition identifying prestored text message to said indicium;

means for visually displaying a representation of said indicium;

means for periodically initiating said analyzing and prioritizing;

means for recording indicia reflecting supplies consumed during the process; and means for automatically displaying a representation of at least some of said supplies consumed.

6. An apparatus usable to provide operator assisting alarm related information for an industrial tool that is operable in an essentially automatic mode, the apparatus comprising:

circuitry for sensing a plurality of inputs from the tool, said circuitry for sensing including means for altering a rate of sensing one or more of the inputs responsive to a state of the tool;

circuitry for processing at least some of the inputs and for generating electrical representations thereof;

circuitry for executing a prestored decision tree and for identifying a highest priority alarm condition for the tool; and circuitry responsive to said executing circuitry for providing a representative of said alarm condition.

7. A method of providing information to an operator to assist in determining a trouble condition in an industrial process which provides a plurality of electrical signals comprising:

sensing the plurality of electrical signals;

processing the plurality of electrical signals;

detecting the presence of one or more trouble conditions, associated with the process;

automatically establishing a priority among the detected trouble conditions by stepping through a predetermined decision tree;

selecting a highest priority trouble condition;

displaying operator assisting screens associated with the selected trouble condition;

receiving operator input for selecting different information screens to be displayed;

storing a plurality of displayable operator assisting information screens; and displaying an operator assisting screen containing at least one graphical message, prestored at least in part, related to the next trouble condition to which the operator should respond.

8. A method of monitoring an automatic, production welding unit that provides a plurality of status indicating signals comprising:

conditioning selected of the status indicating signals;

analyzing predetermined combinations of the conditioned signals to detect the presence of those combinations indicative of a need for operator intervention;

executing a decision tree, in response to the analyzing step, to determine which combination the operator should respond to next;

displaying an operator assisting graphical message, prestored at least in part, related to the next combination to which the operator should respond;

storing representations of selected of the conditioned signals which are indicative of the performance of the welding unit; and selectively providing for the operator visual indicia of the stored representations.

9. A method of monitoring an on-going industrial process having a plurality of relate parameters comprising;

sensing selected of the parameters;

analyzing the sensed parameters to determine the presence of one or more trouble condition;

prioritizing the trouble conditions including executing a predetermined decision tree;

linking a highest priority trouble condition to one member of a plurality of operator assisting display screens;

displaying the one linked screen;

recording values of selected parameters as the process proceeds;

displaying at least one graphical representation of selected parameters of the on-going process;

receiving input from an operator responsive to the one linked and displayed screen;

analyzing the received operator input;

displaying, in response to the analysis, a different operator assisting screen.

* * * * *

65